United States Patent
Barbat et al.

(10) Patent No.: US 10,173,629 B2
(45) Date of Patent: Jan. 8, 2019

(54) COLLAR SHAPED AIRBAG

(71) Applicant: Ford Global Technologies, LLC, Dearborn, MI (US)

(72) Inventors: Saeed David Barbat, Novi, MI (US); Dean M. Jaradi, Macomb, MI (US); Sam Hamade, Redwood City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/413,867

(22) Filed: Jan. 24, 2017

(65) Prior Publication Data
US 2018/0208142 A1    Jul. 26, 2018

(51) Int. Cl.
| | |
|---|---|
| B60R 21/207 | (2006.01) |
| B60R 21/2342 | (2011.01) |
| B60R 21/231 | (2011.01) |
| B60N 2/64 | (2006.01) |
| B60R 21/235 | (2006.01) |
| B60N 2/68 | (2006.01) |
| B60R 21/261 | (2011.01) |
| B60R 21/00 | (2006.01) |

(52) U.S. Cl.
CPC ............. *B60R 21/207* (2013.01); *B60N 2/64* (2013.01); *B60N 2/682* (2013.01); *B60R 21/231* (2013.01); *B60R 21/235* (2013.01); *B60R 21/2342* (2013.01); *B60R 21/261* (2013.01); *B60N 2002/684* (2013.01); *B60R 2021/0048* (2013.01); *B60R 2021/23509* (2013.01); *B60R 2021/2612* (2013.01)

(58) Field of Classification Search
CPC . B60R 21/207; B60R 21/2342; B60R 21/231; B60R 21/261; B60R 21/235; B60R 2021/2612; B60R 2021/23509; B60R 2021/0048; B60N 2/682; B60N 2/64; B60N 2002/684
See application file for complete search history.

(56) References Cited

U.S. PATENT DOCUMENTS

| | | | | |
|---|---|---|---|---|
| 4,637,074 A | * | 1/1987 | Taheri | A41D 13/018 2/456 |
| 4,679,263 A | * | 7/1987 | Honer | A47C 7/383 297/393 |
| 4,825,469 A | * | 5/1989 | Kincheloe | A41D 13/018 2/16 |

(Continued)

FOREIGN PATENT DOCUMENTS

| | | |
|---|---|---|
| DE | 102014201474 A1 | 7/2015 |
| WO | WO 9636249 A1 | 11/1996 |

OTHER PUBLICATIONS

Hovding—Airbag for Cyclists, www.hovding.com, Oct. 25, 2016; 7 pages.
GB Search Report dated Jul. 20, 2018 re GB Appl. No. 1801011.6.

*Primary Examiner* — Darlene P Condra
(74) *Attorney, Agent, or Firm* — Frank A. MacKenzie; Bejin Bieneman PLC

(57) ABSTRACT

An assembly for a vehicle comprises a seat. The assembly includes a collar supported by the seat. The collar has a first end and a second end. The assembly includes a first fastener on the first end and a second fastener on the second end. The assembly includes the first fastener and the second fastener that are releasably connectable with each other. An airbag is disposed in the collar and inflatable to an inflated position.

20 Claims, 10 Drawing Sheets

(56) References Cited

U.S. PATENT DOCUMENTS

| | | | |
|---|---|---|---|
| 5,282,648 A | 2/1994 | Peterson | |
| 5,378,042 A * | 1/1995 | Daneshvar | A47C 7/383 297/393 |
| 5,402,535 A * | 4/1995 | Green | A41D 13/018 128/DIG. 23 |
| 6,158,812 A * | 12/2000 | Bonke | B60R 16/08 297/391 |
| 6,296,204 B1 * | 10/2001 | Lewis | A42B 3/0473 2/413 |
| 6,331,014 B1 | 12/2001 | Breed | |
| 6,666,514 B2 * | 12/2003 | Muraishi | B60N 2/146 248/349.1 |
| 6,729,643 B1 * | 5/2004 | Bassick | A41D 13/0512 2/413 |
| 6,857,136 B1 * | 2/2005 | Bradley | A41D 13/0125 2/102 |
| 7,657,954 B1 * | 2/2010 | Bunkers | A42B 1/048 2/202 |
| 8,316,488 B2 * | 11/2012 | Rojas | A47C 7/383 297/393 |
| 8,402,568 B2 * | 3/2013 | Alstin | A41D 13/018 2/413 |
| 8,708,414 B2 * | 4/2014 | Hurwitz | B60N 2/882 297/393 |
| 8,887,333 B2 * | 11/2014 | Cohen | A47C 7/383 5/636 |
| 9,155,409 B2 * | 10/2015 | Cohen | A47G 9/10 |
| 9,156,426 B1 | 10/2015 | Faruque et al. | |
| 2003/0184142 A1 | 10/2003 | Muraishi et al. | |
| 2008/0282453 A1 * | 11/2008 | Alstin | A41D 13/018 2/413 |
| 2009/0236834 A1 * | 9/2009 | Turner | B60R 21/207 280/733 |
| 2013/0125312 A1 * | 5/2013 | Harooni | A47C 7/383 5/639 |
| 2013/0147242 A1 | 6/2013 | Santana-Gallego et al. | |
| 2015/0054263 A1 * | 2/2015 | Renaudin | B60R 21/16 280/728.2 |
| 2015/0259071 A1 * | 9/2015 | Santana-Gallego | B64D 11/0621 244/121 |
| 2017/0143055 A1 * | 5/2017 | Duncan | A41D 13/018 |

* cited by examiner

COLLAR SHAPED AIRBAG

Vehicles, such as automobiles, may include airbags designed to inflate and be impacted by an occupant of a seat during a sensed impact. A vehicle may include one or more conventional airbags, e.g., steering wheel and instrument panel mounted airbags, that inflate in response to the sensed impact of the vehicle by another object. The airbags may be configured to absorb energy and soften the impact between a head of the occupant and the steering wheel or the instrument panel.

DETAILED DESCRIPTION

Figure 1:
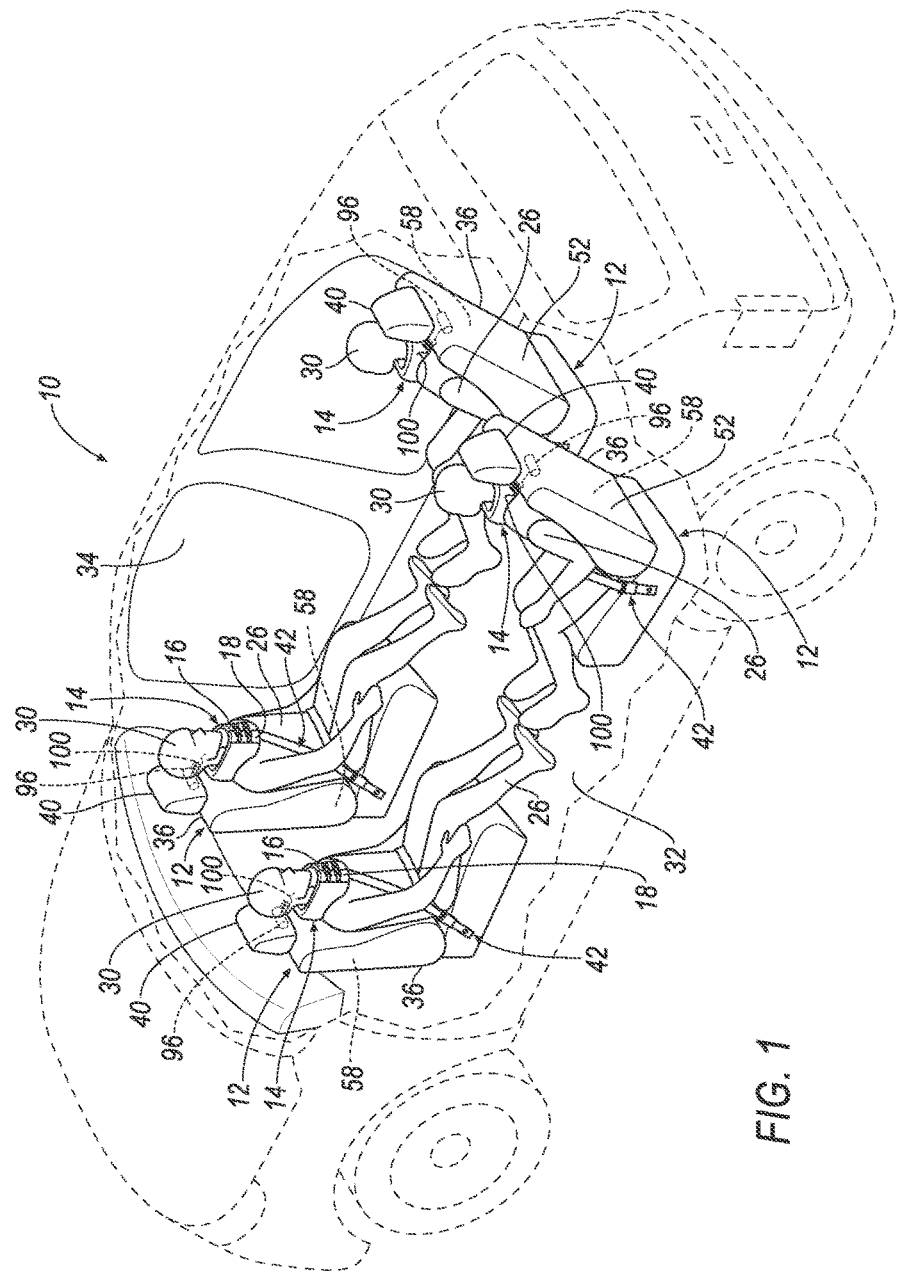
FIG. 1 is a perspective view of a vehicle including a plurality of collars supported by a plurality of seats and a plurality of airbags in an uninflated position.

With reference to the Figures, wherein like numerals indicate like parts throughout the several views, an assembly for a vehicle 10 comprises a seat 12. The assembly includes a collar 14 supported by the seat 12. The collar 14 has a first end 16 and a second end 18. The assembly includes a first fastener 20 on the first end 16 and a second fastener 22 on the second end 18. The assembly includes the first fastener 20 and the second fastener 22 that are releasably connectable with each other. An airbag 24 is disposed in the collar 14 and inflatable to an inflated position.

Figure 2:
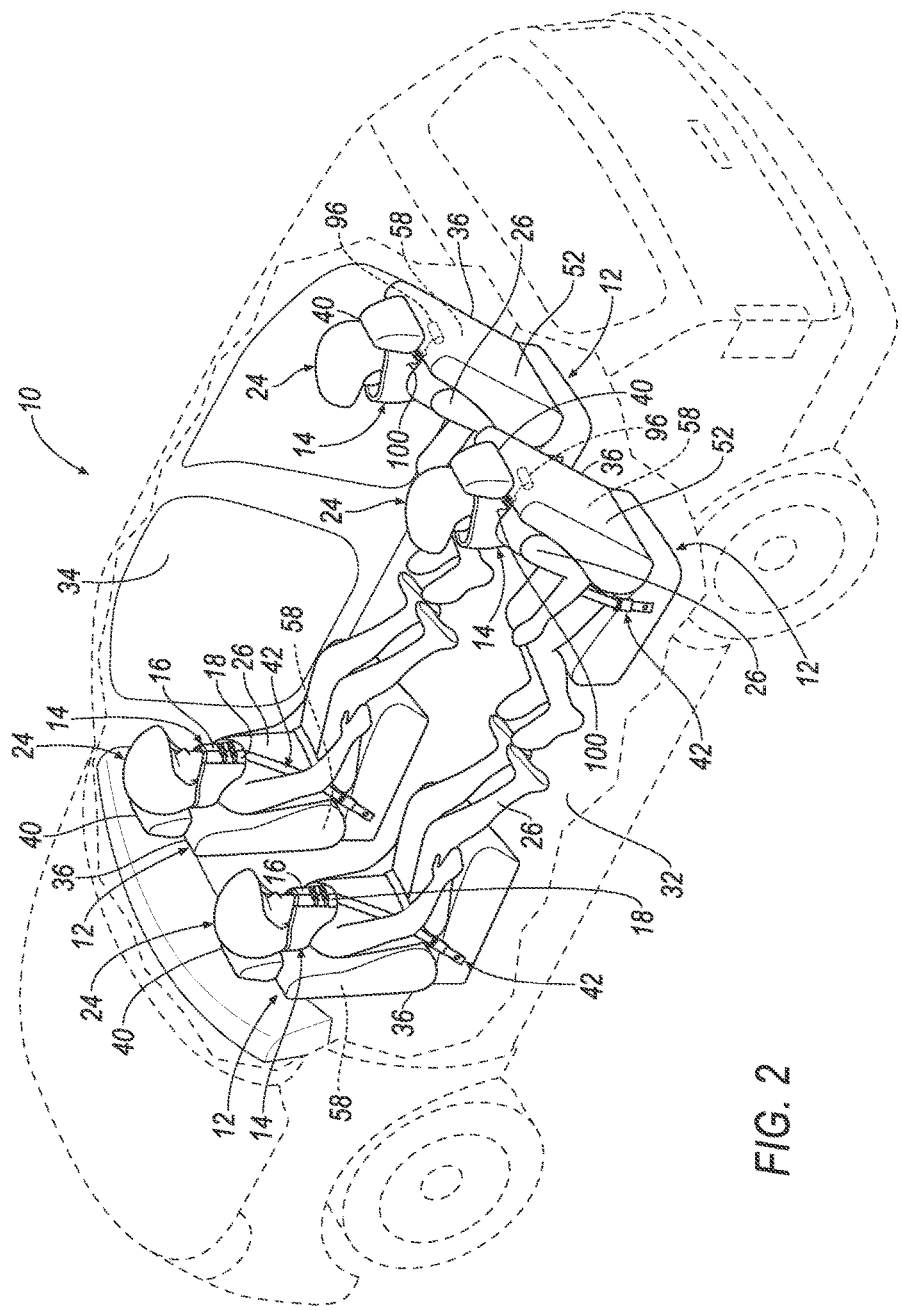
FIG. 2 is the perspective view of FIG. 1 with the plurality of airbags in an inflated position.

When an occupant 26 enters the vehicle 10, the occupant 26 may wrap the collar 14 around a neck 28 of the occupant 26 and may fasten the first fastener 20 and the second fastener 22 to each other to secure the collar 14 to the neck 28 of the occupant 26. During a sensed impact, a body of the occupant 26 may move toward a direction of the sensed impact. In that instance, the airbag 24 may inflate from an uninflated position, as shown in FIG. 1, to the inflated position, as shown in FIG. 2. In the inflated position, the airbag 24 may absorb energy from a head 30 of the occupant 26, The vehicle 10 may, for example, be an autonomous vehicle, in which case the seat 12 may swivel to face any direction within the vehicle 10, as described further below. Since the collar 14 is supported by the seat 12, the collar 14 swivels with the seat 12 and may inflate and absorb energy from the occupant 26 regardless of the direction of the sensed impact and the orientation of the seat 12.

The Society of Automotive Engineers (SAE) has defined multiple levels of autonomous vehicle operation. At levels 0-2, a human driver monitors or controls the majority of the driving tasks, often with no help from the vehicle 10. For example, at level 0 ("no automation"), the human driver is responsible for all vehicle operations. At level 1 ("driver assistance"), the vehicle 10 sometimes assists with steering, acceleration, or braking, but the human driver is still responsible for the vast majority of the vehicle control. At level 2 ("partial automation"), the vehicle 10 can control steering, acceleration, and braking under certain circumstances without human interaction. At levels 3-5, the vehicle 10 assumes more driving-related tasks. At level 3 ("conditional automation"), the vehicle 10 can handle steering, acceleration, and braking under certain circumstances, as well as monitoring of the driving environment. Level 3 requires the human driver to intervene occasionally. At level 4 ("high automation"), the vehicle 10 can handle the same tasks as at level 3 but without relying on the human driver to intervene in certain driving modes. At level 5 ("full automation"), the vehicle 10 can handle almost all tasks without any human driver intervention. The vehicle 10 may operate in one or more of the levels of autonomous vehicle operation. As used herein, non-autonomous modes of operation may refer to levels 0-1, partially autonomous modes of operation may refer to levels 2-3, and fully autonomous modes of operation may refer to levels 4-5.

The vehicle 10 includes a vehicle floor 32. The vehicle floor 32 may support components within a passenger cabin 34 of the vehicle 10 such as the seat 12, instrument panel, center console, etc.

With continued reference to FIGS. 1-2, the vehicle 10 may include a plurality of seats. For example, as shown in FIGS. 1-2, the vehicle floor 32 may support four seats. Each seat 12 may be supported on the vehicle floor 32. The position and orientation of each seat 12 may be adjustable by the occupant 26.

The seat 12 may include a seat back 36, a seat bottom 38, and a head restraint 40. The head restraint 40 may, for example, be part of the seat back 36, i.e., the head restraint 40 and the seat back 36 may be integrated. The head restraint 40 and the seat back 36 may be stationary or movable relative to each other. The seat back 36 may be supported by the seat bottom 38 and may be stationary or movable relative to the seat bottom 38. The vehicle 10 may include any suitable number of seats 12 in any suitable arrangement.

The assembly may include a seat belt 42. The seat belt 42 may releasably secure the occupant 26 to the vehicle 10. The seat belt 42 may include a seat belt retractor (not shown), a belt 44, a clip 48, etc. The seat belt 42 may be connected to the vehicle 10 and/or to the seat 12. The seat belt 42 may be of any suitable type, e.g., a three-point seat belt.

The seat back 36 may include a front panel 50 spaced from a back panel 52, and side panels 54 connecting the front panel 50 to the back panel 52. As shown in FIGS. 3-6, the side panels 54 connect the front panel 50 to the back panel 52 along an edge 56 that is adjacent to the front panel 50 and the back panel 52. The front panel 50, back panel 52, and side panels 54 may form a space 58 within the seat back 36. The space 58 may, for example, be hollow and designed to house components within the seat back 36 such as a seat back frame, seat cushion foam, recliner components, etc.

The seat 12 may include a rotational mechanism 60 connected to the seat bottom 38. The rotational mechanism 60 may be configured to connect the seat bottom 38 to the vehicle floor 32, as shown in FIGS. 3-6. The rotational mechanism 60 may allow the seat 12 to rotate relative to the vehicle floor 32, i.e., the seat 12 may swivel to face in any direction within the passenger cabin 34 of the vehicle 10. The seat 12 may be rotatable about a rotational axis R that extends generally perpendicular from the vehicle floor 32 and through a center of the seat bottom 38. The rotational mechanism 60 may include a system of parts such as a shaft, a bearing, a gear, etc. The rotational mechanism 60 may, for example, be connected to the vehicle floor 32 or an intermediate location between the vehicle floor 32 and the seat bottom 38 along the rotational axis R. The rotational mechanism 60 may, for example, rotate relative to the seat 12 and/or may rotate relative to the vehicle floor 32. The rotational mechanism 60 allows the occupant 26 to rotate the seat 12 to a preferred orientation within the passenger cabin 34 of the vehicle 10.

Figure 3:
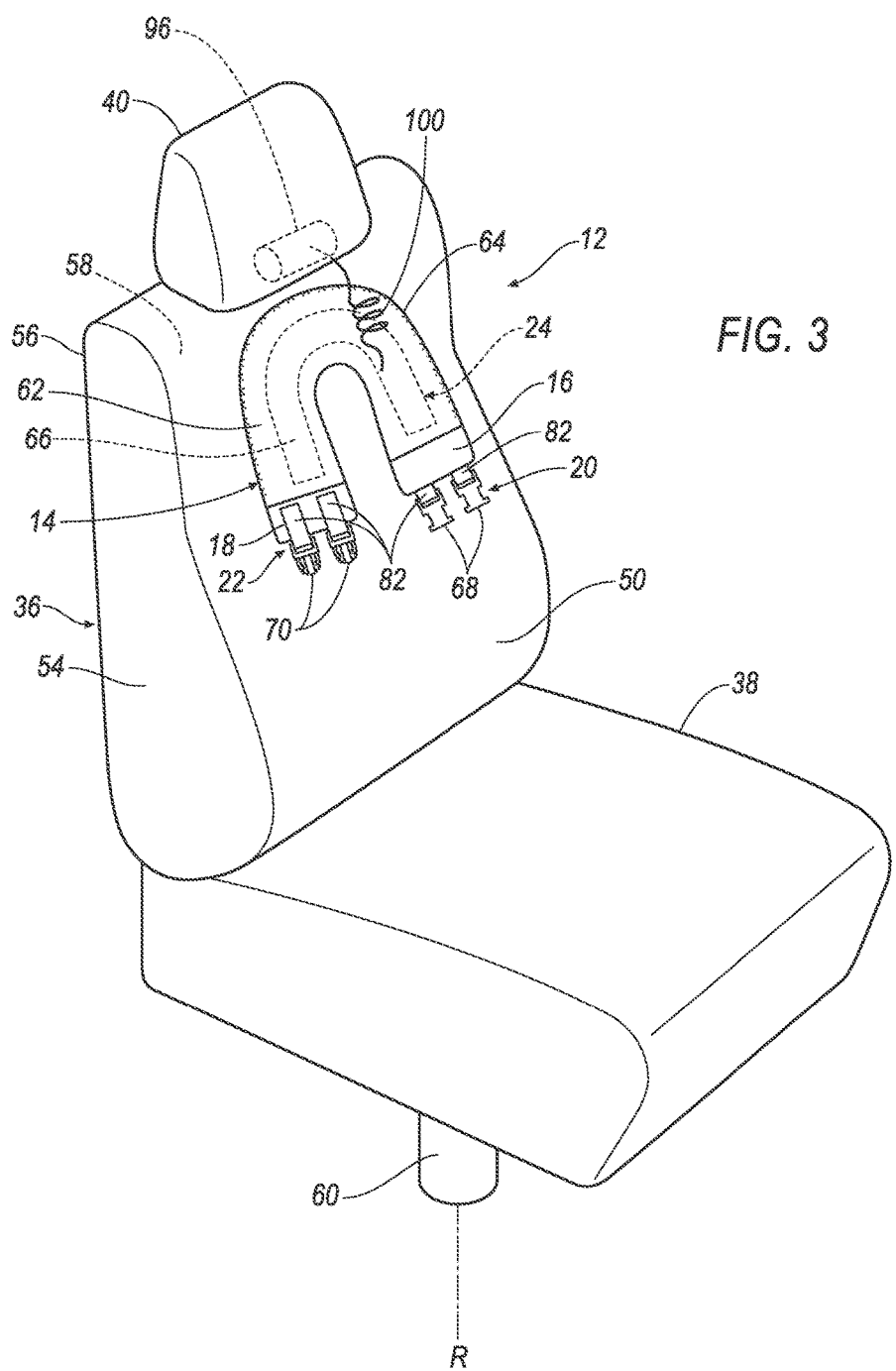
FIG. 3 is a front perspective view of one example embodiment of a collar supported by a seat.

As set forth above, the assembly includes the collar 14 supported by the seat 12. As shown in FIG. 3, the collar 14 may be supported by the seat back 36. The collar 14 may include an intermediate portion 62 between the first end 16 and the second end 18 (these instances of the adjectives "first" and "second" are used as identifiers and are not intended to signify importance or order). The collar 14 may, for example, be a textile sewn into various configurations and formed of any suitable material, e.g., cotton, nylon, polyester, etc. The collar 14 may be designed to secure a stationary object, e.g., the seat 12, to a non-stationary object, e.g., the occupant 26. The collar 14 may distribute forces across an upper body of the occupant 26 while providing the occupant 26 with sufficient freedom of movement when seated within the passenger cabin 34 of the vehicle 10.

The collar 14 may include a tear seam 64. The tear seam 64 may extend along the intermediate portion 62 of the collar 14 between the first end 16 and the second end 18, as shown in FIGS. 3-6. The tear seam 64 may, for example, be a weakened area through which the airbag 24 extends when the airbag 24 is inflated. The tear seam 64 may be configured, e.g., sized, shaped, positioned, to rupture when a pressure of the airbag 24 exceeds a threshold pressure. In the uninflated position, the tear seam 64 is closed. When the pressure in the inflation chamber 66 exceeds the threshold inflation pressure, the tear seam 64 ruptures thus allowing the airbag 24 to inflate to the inflated position. In the inflated position, the airbag 24 extends through the tear seam 64. The size and type of airbag 24 may, for example, influence the shape and length of the tear seam 64. The tear seam 64 may be an area of reduced thickness, a frangible stitch, etc.

As set forth above, the collar 14 includes the first fastener 20 on the first end 16 of the collar 14 and the second fastener 22 on the second end 18 of the collar 14. The first fastener 20 and the second fastener 22 are releasably connectable to each other. In other words, the first fastener 20 and the second fastener 22 may connect to each other to secure the occupant 26 to the seat 12 and release from each other to allow the occupant 26 to remove the collar 14 and exit from the seat 12. The first fastener 20 and the second fastener 22 may, for example, be adjustable to allow the occupant 26 to loosen and tighten the collar 14 around the neck 28 of the occupant 26. The first fastener 20 and the second fastener 22 may be on the first end 16 and the second end 18 in any suitable manner, e.g., sewn, clip, adhesive, etc.

As shown in FIGS. 1-5, and 8A, one of the first fastener 20 and the second fastener 22 may include a buckle 68 and the other of the first fastener 20 and the second fastener 22 may include a tongue 70 releasably engageable with the buckle 68. The buckle 68 may, for example, include a passage through which the tongue 70 is inserted and engages the buckle 68. Further, the buckle 68 and/or tongue 70 may include a latch 72 that releases the tongue 70 from the passage of the buckle 68. The first fastener 20 and the second fastener 22 may include a strap 82 that is connected to the buckle 68 and the tongue 70. The occupant 26 may, for example, pull on the strap 82 to tighten and loosen the collar 14 around the neck 28 of the occupant 26. The buckle 68 and the tongue 70 may be any suitable type such as a clasp, slide, belt buckle, side-release buckle, etc. The buckle 68 and the tongue 70 may be formed of any suitable material, e.g., metal, leather, plastic, etc.

Figure 8A:
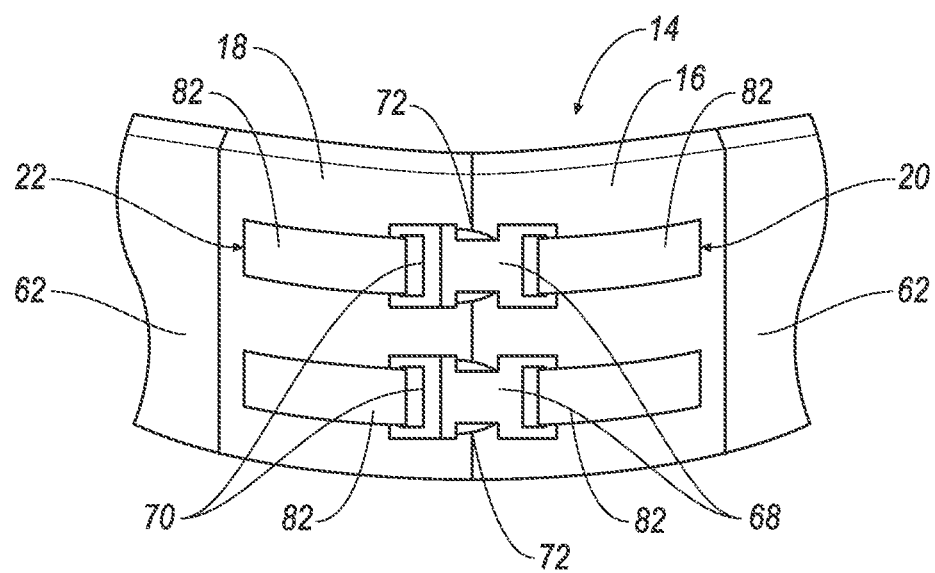
FIG. 8A is a front view of one of the first and second fastener as a buckle and the other of the first and second fastener as a tongue.
Figure 8B:
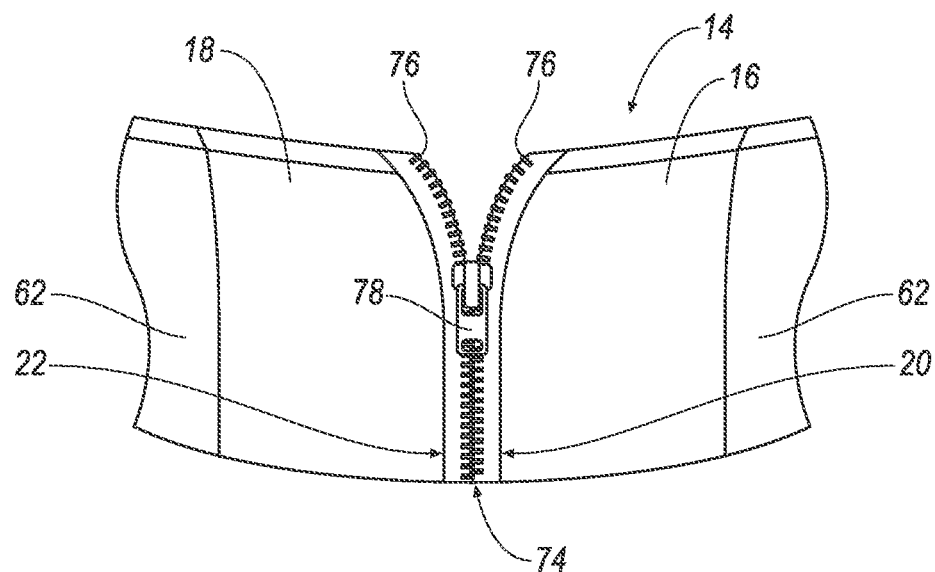
FIG. 8B is the front view of FIG. 8A with the first and second fasteners as halves of a zipper.

As another example, the first fastener 20 and the second fastener 22 may be halves of a zipper 74 engageable with each other. One half of the zipper 74 may be on the first end 16 and the other half of the zipper 74 may be on the second end 18. As shown in FIG. 8B, one half of the zipper 74 may include a flexible strip 76 with interlocking projections that engage the other half of the zipper 74 by pulling a slide 78 along the halves of the zipper 74. The halves of a zipper 74 may be a variety of shapes, sizes, and types such as a coil zipper, open-ended zipper, magnetic zipper, etc. The halves of a zipper 74 may be formed of any suitable material, e.g., metal, plastic, etc.

Figure 7A:
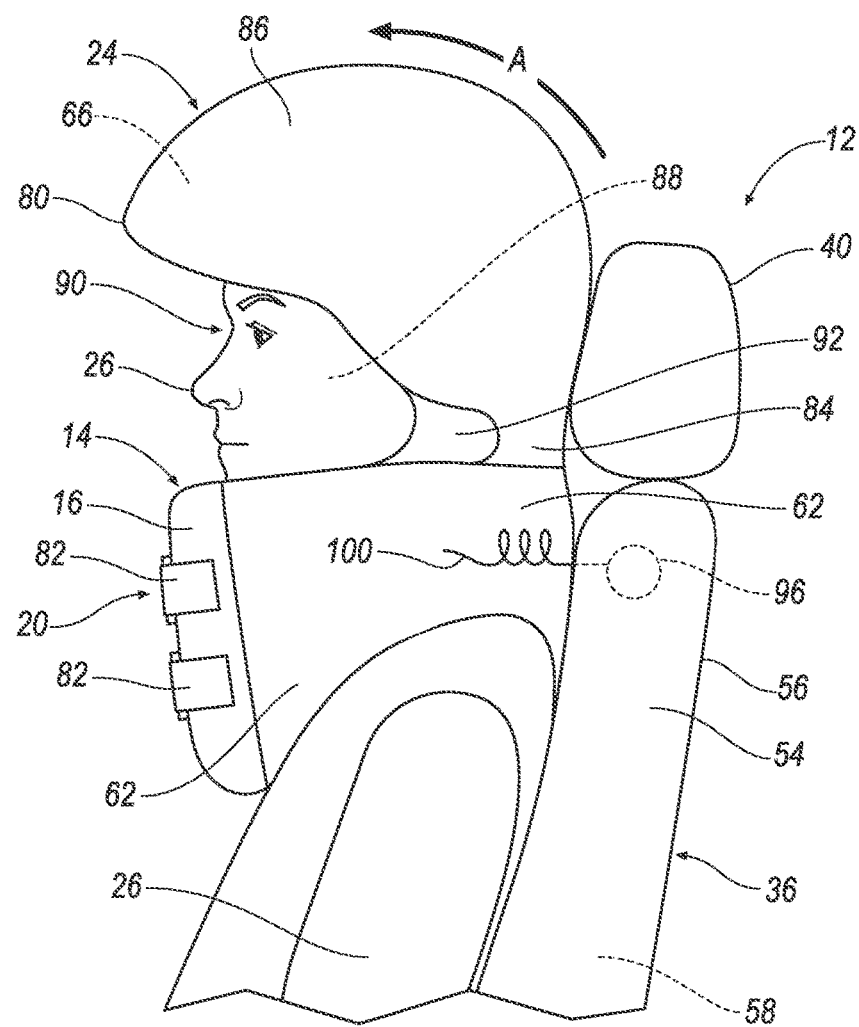
FIG. 7A is a side view of the airbag in the inflated position and a fill tube in fluid communication with the airbag.

As set forth above, the airbag 24 is disposed in the collar 14. Specifically, the airbag 24 may be elongated along a direction extending from the first end 16 to the second end 18. In response to a sensed impact, the airbag 24 may inflate upwardly in a semi-cylindrical manner around the neck 28 of the occupant 26 and outwardly away from the head restraint 40 over the head 30 of the occupant 26. In the inflated position, the airbag 24 may include an end 80 distal to the seat back 36. The airbag 24 may extend along an arcuate path A from the collar 14 to the end 80, as shown in FIG. 7A. The distance along the arcuate path A may depend on the size and shape of the airbag 24 in the inflated position. The shape of the airbag 24 may, for example, resemble that of a helmet in the inflated position.

Figure 7B:
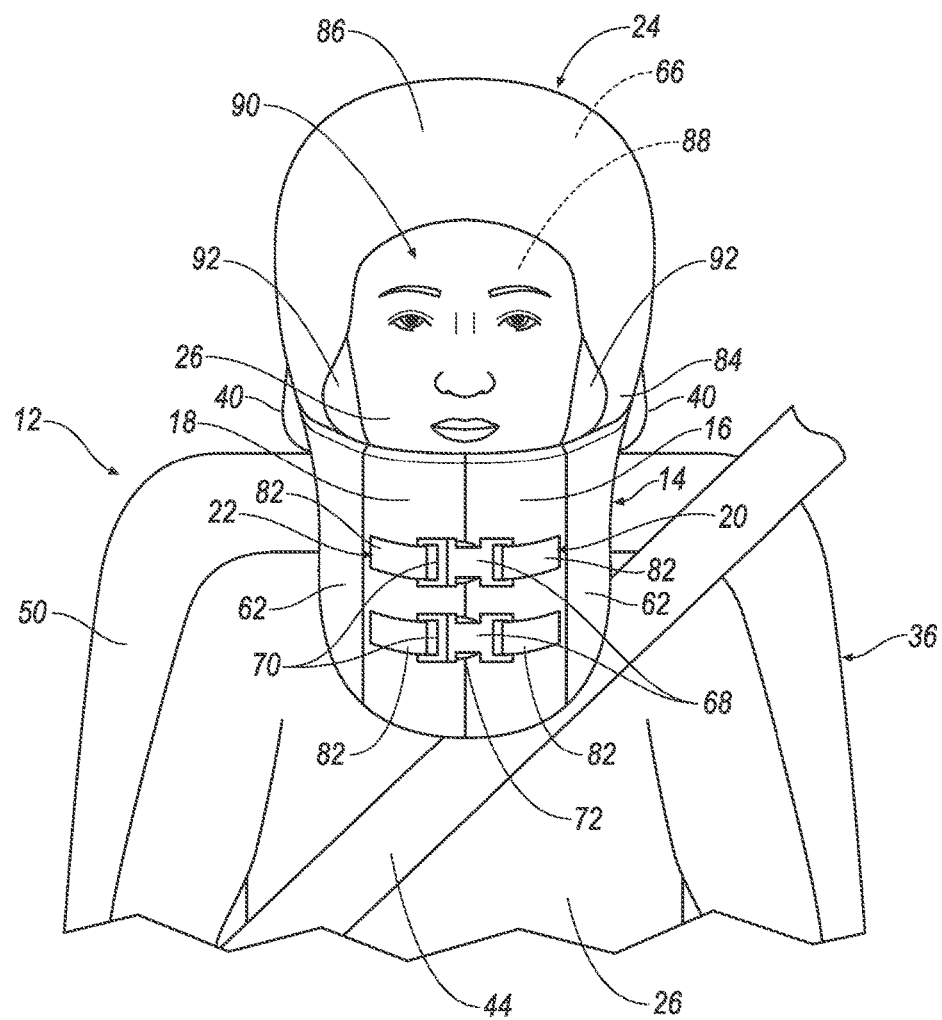
FIG. 7B is a front view of the airbag in the inflated position including a face opening in fluid communication with a head cavity.

With continued reference to FIGS. 7A-B, the airbag 24 in the inflated position may include a neckband portion 84 that is longitudinally adjacent to the collar 14 relative to the intermediate portion 62. In other words, the neckband portion 84 may extend along the tear seam 64 toward the first end 16 and the second end 18. The airbag 24 in the inflated position may include a hood portion 86 that is adjoined to the neckband portion 84 and extends along the arcuate path A toward the end 80. The hood portion 86 may be configured, e.g., sized, shaped, position, to cover a back, a top, and sides of the head 30 of the occupant 26. The airbag 24 in the inflated position may include a head cavity 88. The head cavity 88 may be hollow and located within hood portion 86 when the airbag 24 is in the inflated position. The head cavity 88 may be configured, e.g., sized, shaped, positioned, to contain the head 30 of the occupant 26. Additionally, the end 80 may define a face opening 90 in communication with the head cavity 88. For example, the face opening 90 may cover the front of the head 30 of the occupant 26, as shown in FIGS. 7A-B. The airbag 24 may include a slot 92 between the neckband portion 84 and the hood portion 86 that extends away from the first end 16 and the second end 18 relative to the intermediate portion 62. The airbag 24 may, for example, have a left and right slot 92 that are located near a left and right ear of the occupant 26. A fabric covering may extend across the left slot and the right slot 92.

The airbag 24 may be formed of any suitable type of material, e.g., from a woven polymer. For example, the airbag 24 may be formed of woven nylon yarn, e.g., nylon 66. Other suitable examples include polyetheretherketone (PEEK), polyetherketoneketone (PEKK), polyester, or any other suitable polymer. The woven polymer may include a coating, such as, for example, silicone, neoprene, urethane, etc. For example, the coating may be polyorganosiloxane.

The airbag 24 includes the inflation chamber 66 inflatable with an inflation medium. The assembly may include an inflator 96 mounted on the seat 12 and in fluid communication with the airbag 24. The inflator 96 may, for example, be mounted on the seat back 36 in the space 58 between the front panel 50, back panel 52, and side panels 54. In other words, the inflator 96 may be hidden from view within the seat back 36, as shown in FIGS. 1-6 and 7B. The inflator 96 may be a pyrotechnic inflator that uses a chemical reaction to drive inflation medium to the airbag 24. The inflator 96 may be of any suitable type, e.g., a cold-gas inflator, hybrid inflator, etc. Upon receiving a signal from, e.g., a controller 96, the inflator 96 may inflate the airbag 24 with the inflation medium, such as a gas.

The assembly includes a fill tube 100 in fluid communication with the airbag 24 and the inflator 96. The fill tube 100 may, for example, be connected to the collar 14 at the intermediate portion 62 spaced from the first end 16 and the second end 18. The fill tube 100 may be the shape of a resiliently flexible coil, i.e., concentric circles arranged in a spiral or sequence of helical rings. Since the fill tube 100 is resiliently flexible, the fill tube 100 returns to the coil shape after being deformed, stretched, etc., during use. The fill tube 100 may be formed from an elastic material that allows the fill tube 100 to return to its original shape after a force is applied. The fill tube 100 may, for example, have a length of 10-15 inches.

In one embodiment, as shown in FIG. 3, the fill tube 100 may support the collar 14 on the seat 12. In other words, the weight of the collar 14 and the airbag 24 are supported on the seat 12 solely by the fill tube 100.

Figure 4:
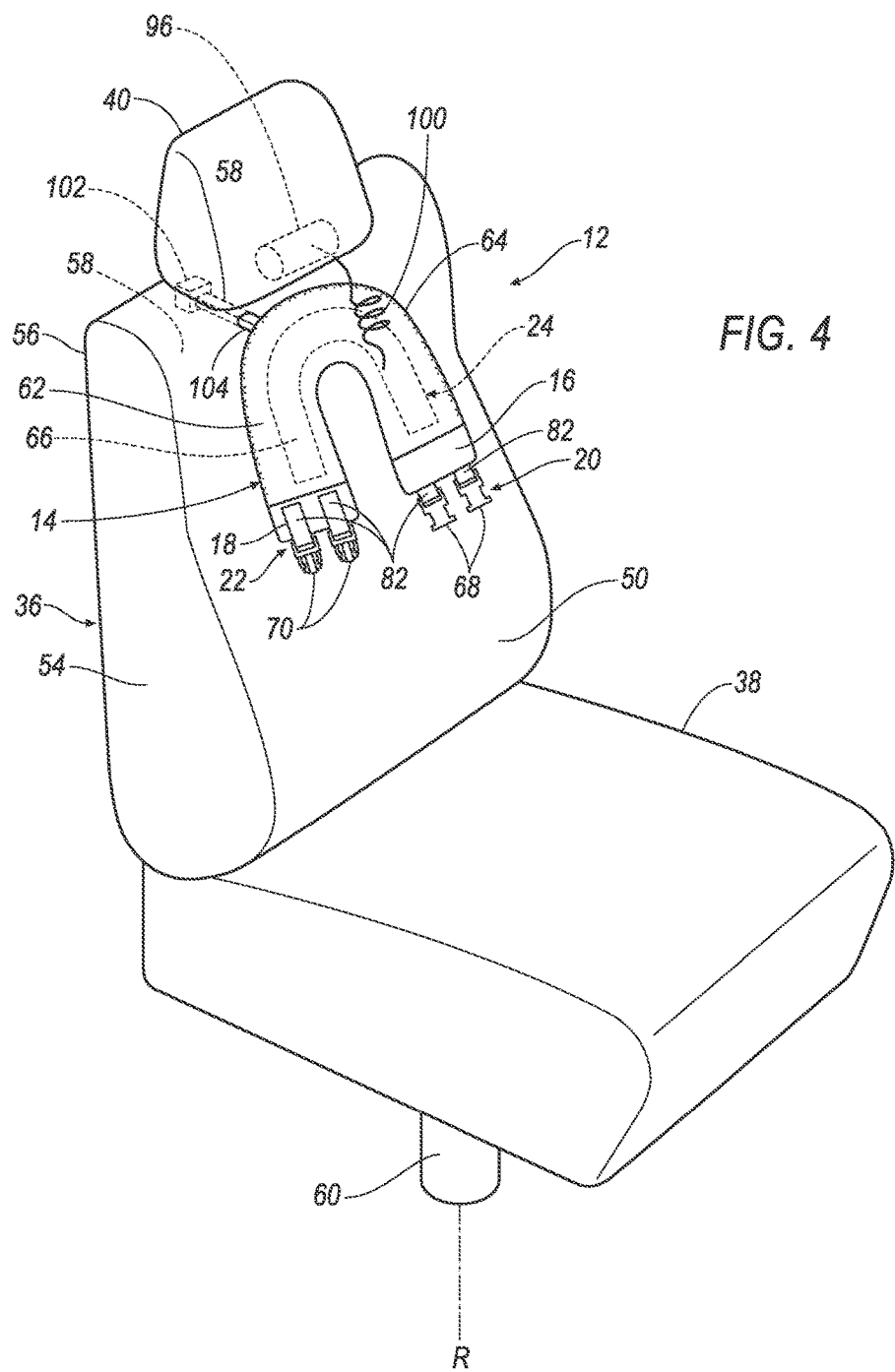
FIG. 4 is a front perspective view of another example embodiment of the collar supported by the seat.
Figure 5:
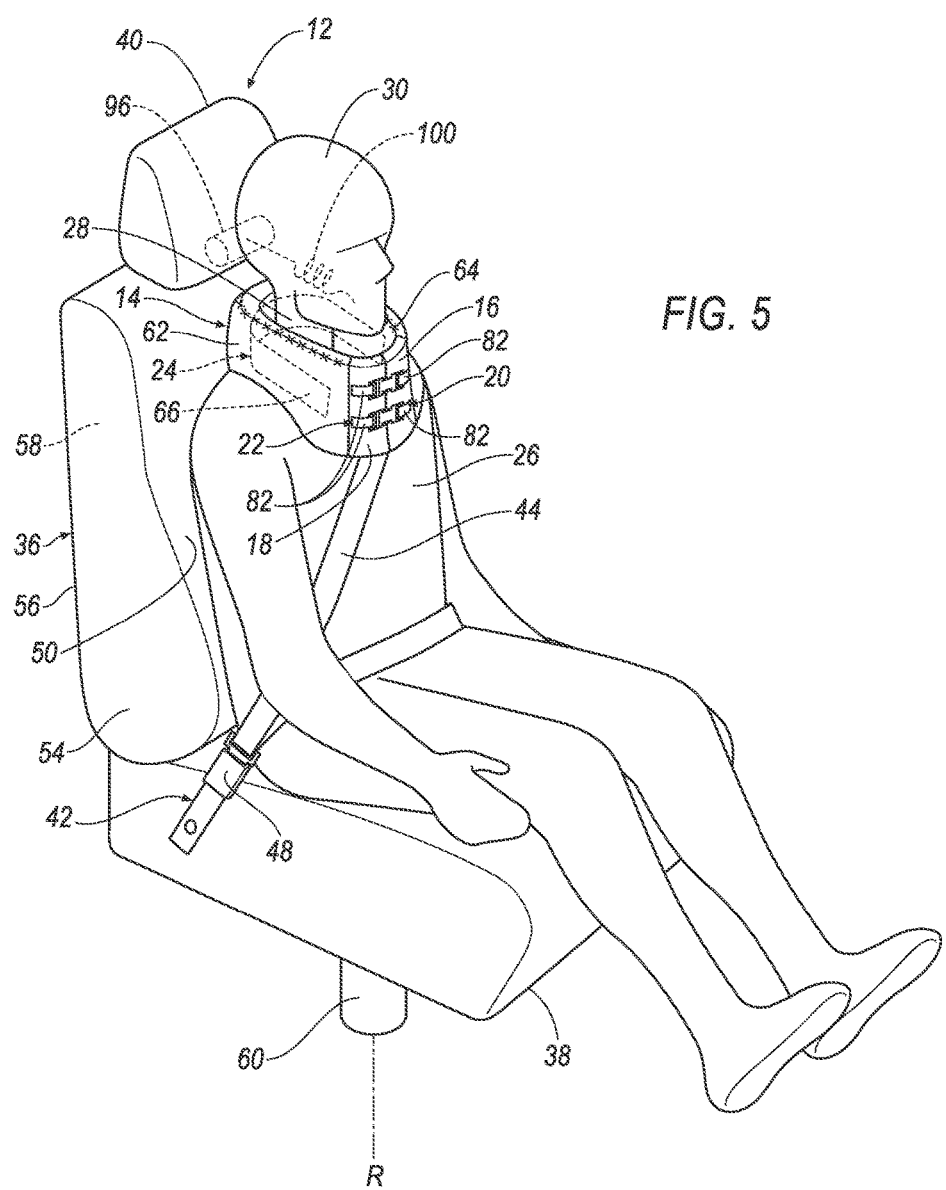
FIG. 5 is the front perspective view of FIG. 3 with the collar around a neck of an occupant and a first fastener on a first end releasably connected to a second fastener on a second end.
Figure 6:
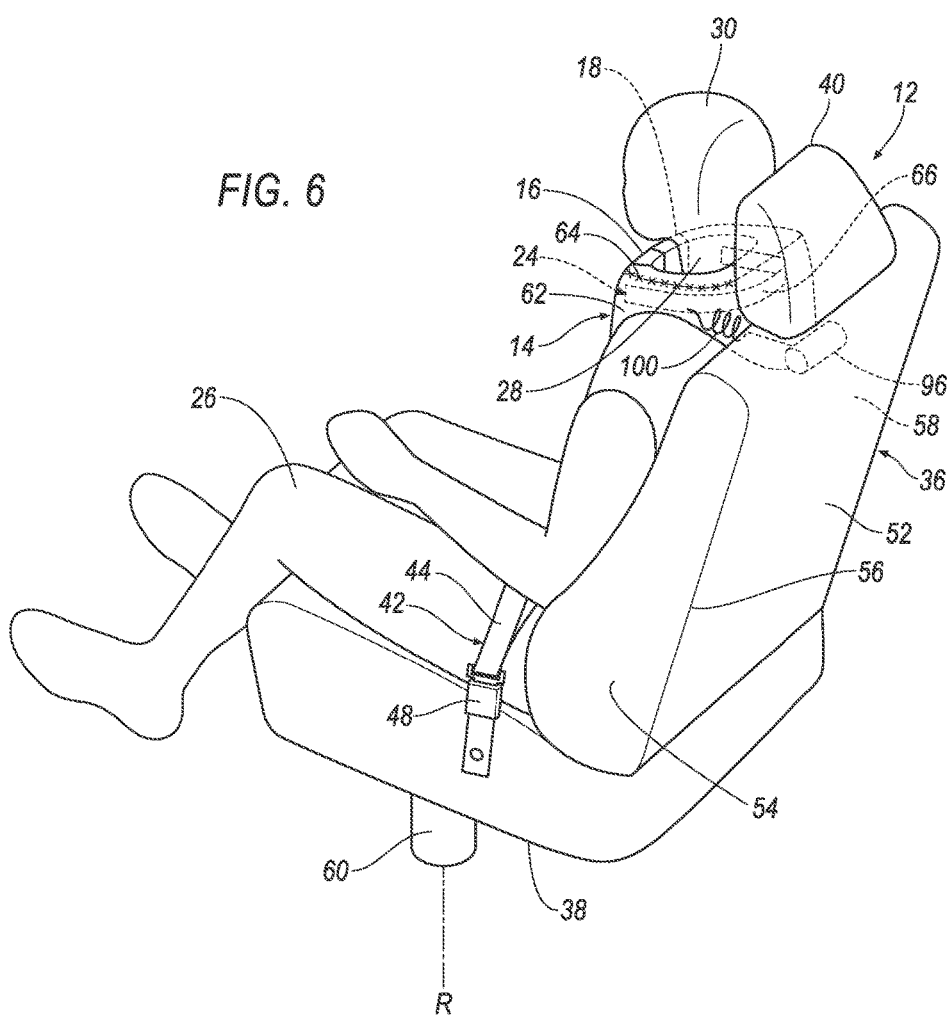
FIG. 6 is a rear perspective view of the seat with an inflator mounted on the seat.

In another example embodiment, as shown in FIG. 4, the assembly may include a retractor 102 mounted on the seat 12. Specifically, the retractor 102 may be mounted within the space 58 between the front panel 50, back panel 52, and side panels 54. In other words, the retractor 102 may be hidden from view within the seat back 36. The retractor 102 may include a retractor shaft (not shown) rotatable about a retractor axis (not shown) and a locking mechanism (not shown). The locking mechanism may be moveable to a locked position that prevents rotation of the retractor shaft. The locking mechanism may, for example, be an inertia-based device such as a cam, a linear retractor, a skip-lock, etc.

The retractor 102 may include a flexible webbing 104 connecting the retractor 102 to the collar 14. Specifically, the flexible webbing 104 may be attached to the retractor shaft, as shown in FIGS. 1-6A. The flexible webbing 104 may rotate the retractor shaft, unspooling the flexible webbing 104 from the retractor shaft when the occupant 26 pulls on the collar 14. Alternatively, the retractor shaft may rotate to spool the flexible webbing 104 back onto the retractor shaft when the occupant 26 releases the collar 14, e.g., disconnects the first fastener 20 and the second fastener 22 from each other. During a sensed impact, the flexible webbing 104 may absorb the impact energy from the occupant 26 moving in the direction of the sensed impact. The flexible webbing 104 may, for example, be formed of fibers such as cotton, nylon, polyester, etc. The construction of the flexible webbing 104 may, for example, be flat webbing or tubular webbing.

Figure 9:
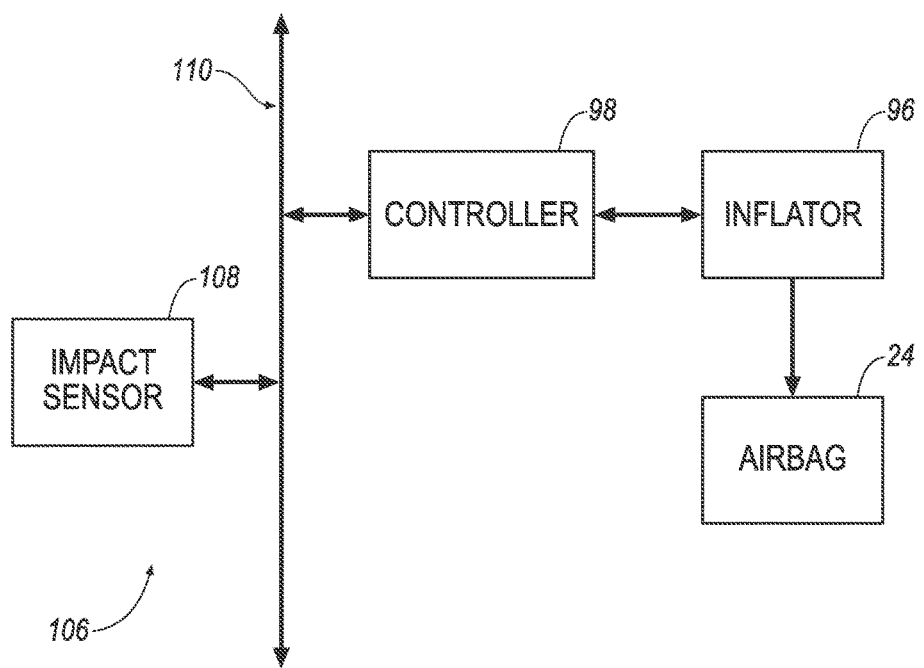
FIG. 9 is a block diagram of a control system.

With reference to FIG. 9, the vehicle 10 may include a control system 106 having the controller 98 in communication with the inflator 96 and/or an impact sensor 108. The controller 98, the inflator 96, and the impact sensor 108 may communicate through a communications network 110.

The controller 98 may be a microprocessor-based controller. The controller 98 may include a processor, memory, etc. The memory of the controller 98 may store instructions executable by the controller 98.

The impact sensor 108 may be in communication with the controller 98. The impact sensor 108 is adapted to detect an impact to the vehicle 10. The impact sensor 108 may be of any suitable type, for example, post-contact sensors such as accelerometers, pressure sensors, contact switches; and pre-impact sensors such as radar, LIDAR, and vision-sensing systems. The vision-sensing system may include one or more cameras, CCD image sensors, CMOS image sensors, etc. The impact sensor 108 may be located at numerous points in or on the vehicle 10.

The control system 106 may transmit signals through the communications network 110 (such as a controller area network (CAN) bus), Ethernet, and/or by any other wired or wireless communication network.

When the occupant 26 enters the vehicle 10, the first fastener 20 on the first end 16 may be disconnected from the second fastener 22 on the second end 18. In that instance, the occupant 26 may pull the first end 16 and the second end 18 around the neck 28 of the occupant 26 and connect the first fastener 20 to the second fastener 22. Additionally, in the example where the vehicle 10 is autonomous, the occupant 26 may rotate the seat 12 to a preferred orientation within the passenger cabin 34 of the vehicle 10. In response to a sensed impact with another object, the body of the occupant 26 may move toward a direction of the sensed impact however the relative motion of the head 30 may depend on the orientation of the seat 12 at the moment of the sensed impact. In that instance, the impact sensor 108 may transmit an instruction through the communications network 110 to the controller 98. The controller 98 may be programmed to instruct the inflator 96 to inflate the airbag 24. When the pressure in the inflation chamber 66 of the airbag 24 reaches the threshold inflation pressure, the tear seam 64 opens thus allowing the airbag 24 to inflate upwardly in a semi-cylindrical manner around the neck 28 of the occupant 26 and outwardly away from the head restraint 40 over the head 30 of the occupant 26. In the inflated position, the airbag 24 extends through the tear seam 64 along the arcuate path A from the collar 14 to the end 80, as shown in FIG. 7A. The airbag 24 may, for example, resemble the shape of a helmet in the inflated position. The airbag 24 in the inflated position may absorb energy from the head 30 of the occupant 26, regardless of the direction of the sensed impact and orientation of the seat 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seat;
   a collar supported by the seat and having a first end and a second end;
   a first fastener on the first end and a second fastener on the second end, the first and second fasteners being releasably connectable with each other; and
   an airbag disposed in the collar and inflatable to an inflated position, the airbag in the inflated position including a hood portion supported on the collar;
   wherein the collar includes a tear seam, and the airbag extends through the tear seam in the inflated position.

2. The assembly as set forth in claim 1, further comprising an inflator mounted on the seat and in fluid communication with the airbag.

3. The assembly as set forth in claim 2, further comprising a fill tube in fluid communication with the airbag and the inflator, the fill tube having a resiliently flexible coil shape.

4. The assembly as set forth in claim 2, further comprising a fill tube in fluid communication with the airbag and the inflator, the fill tube supporting the collar on the seat.

5. The assembly as set forth in claim 4, wherein the collar includes an intermediate portion between the first end and the second end, and the fill tube is connected to the collar at the intermediate portion spaced from the first end and the second end.

6. The assembly as set forth in claim 1, wherein the seat includes a seat back, the collar being supported by the seat back.

7. The assembly as set forth in claim 1, wherein one of the first and second fastener includes a buckle and the other of the first and second fastener includes a tongue releasably engageable with the buckle.

8. The assembly as set forth in claim 1, wherein the first and second fasteners are halves of a zipper, the halves of the zipper engageable with each other.

9. The assembly as set forth in claim 1, further comprising a retractor mounted on the seat, and a flexible webbing connecting the retractor to the collar.

10. The assembly as set forth in claim 9, further comprising a seatbelt spaced from the flexible webbing, the seatbelt being detached from the collar and disposed external to the collar.

11. The assembly as set forth in claim 1, wherein the collar is a textile.

12. The assembly as set forth in claim 1, wherein the seat includes a seat bottom and a rotational mechanism connected to the seat bottom, the rotational mechanism being configured to connect the seat bottom to a vehicle floor.

13. The assembly as set forth in claim 1, wherein the airbag is elongated along a direction extending from the first end to the second end.

14. The assembly as set forth in claim 1, wherein the seat includes a seat back, the airbag in the inflated position including an end distal to the seat back and the collar, the airbag in the inflated position extending along an arcuate path from the collar to the end.

15. The assembly as set forth in claim 14, wherein the airbag in the inflated position includes a head cavity located within the hood portion, and wherein the end defines a face opening in communication with the head cavity.

16. The assembly as set forth in claim 1, further comprising a seatbelt releasably connectable with the seat, the seatbelt being detached from the collar and disposed external to the collar.

17. The assembly as set forth in claim 1, wherein the collar includes an intermediate portion between the first end and the second end, the airbag including a neckband portion longitudinally adjacent to the collar relative to the intermediate portion.

18. The assembly as set forth in claim 17, wherein the hood portion is adjoined to the neckband portion, the hood portion extending farther in a direction from the first end to the second end than the neckband portion.

19. The assembly as set forth in claim 1, wherein the first fastener and the second fastener are connectable to each other in an uninflated position, the first fastener and the second fastener being connected to each other during inflation from the uninflated position to the inflated position.

20. An assembly, comprising:
    a seat;
    a collar supported by the seat and having a first end and a second end;
    a first fastener on the first end and a second fastener on the second end, the first and second fasteners being releasably connectable with each other;
    an airbag disposed in the collar and inflatable to an inflated position, the airbag in the inflated position including a hood portion supported on the collar;
    a retractor mounted on the seat, and a flexible webbing connecting the retractor to the collar; and
    a seatbelt spaced from the flexible webbing, the seatbelt being detached from the collar and disposed external to the collar.

* * * * *